United States Patent [19]
Kühle et al.

[11] 3,925,443
[45] *Dec. 9, 1975

[54] ALKYLSULPHURIC ACID SALTS OF SUBSTITUTED GUANIDINES

[75] Inventors: Engelbert Kühle, Berg. Gladbach; Ferdinand Grewe, Burscheid; Helmut Kaspers, Leverkusen, all of Germany

[73] Assignee: Bayer Aktiengesellschaft, Leverkusen, Germany

[ * ] Notice: The portion of the term of this patent subsequent to May 19, 1987, has been disclaimed.

[22] Filed: Sept. 3, 1968

[21] Appl. No.: 757,091

[30] Foreign Application Priority Data
Sept. 14, 1967 Germany.......................... 1668019

[52] U.S. Cl............................. 260/459 R; 424/303
[51] Int. Cl.$^2$........................................ C07C 141/02
[58] Field of Search............ 260/459, 501.14, 459 R

[56] References Cited
UNITED STATES PATENTS
3,142,615   7/1964   Wehner...................... 260/501.14

FOREIGN PATENTS OR APPLICATIONS
1,536,632   8/1968   France.............................. 260/459

OTHER PUBLICATIONS
*South African Patent Journal*, July 1968, p. 174.
Chemical Abstracts, Vol. 70, 67691q (1969).

*Primary Examiner*—Joseph E. Evans
*Attorney, Agent, or Firm*—Burgess, Dinklage & Sprung

[57] ABSTRACT

N-(dodecyl and tetradecyl)-N'-(unsubstituted and mono- and di- alkyl and/or phenyl substituted)-N''-(unsubstituted and mono- alkyl and phenyl substituted)-guanidine-alkyl sulfuric acid salts, which possess fungicidal properties and which may be produced by conventional methods.

10 Claims, No Drawings

ALKYLSULPHURIC ACID SALTS OF SUBSTITUTED GUANIDINES

The present invention relates to and has for its objects the provision for new alkyl sulfuric acid salts of substituted guanidines, i.e. N-(dodecyl and tetradecyl)-N'-(optionally alkyl and/or phenyl substituted)-N''-(optionally alkyl and phenyl substituted)-guanidine-alkyl sulfates, which possess fungicidal properties, active compositions in the form of mixtures of such compounds with solid and liquid dispersible carrier vehicles, and methods for producing such compounds and for using such compounds in a new way especially for combating fungi, with other and further objects becoming apparent from a study of the within specification and accompanying examples.

It is known that certain salts of dodecylguanidine, in particular the acetate (A), can be used as fungicides (see Belgian Pat. No. 568,612). These salts have a considerable practical importance.

It has been found in accordance with the present invention that the new alkyl sulfuric acid salts of substituted guanidines having the formula $$R_1NH-C\begin{matrix}NR_2\\ \diagdown\\ N\\ \diagdown\\ R_4\end{matrix}\begin{matrix}\diagup\\ \diagup R_3\\ \\ \cdot HOSO_2OR_5\end{matrix} \quad (I)$$

in which
R$_1$ is dodecyl or tetradecyl,
R$_2$, R$_3$ and R$_4$ are each individually hydrogen, alkyl having
  1-4 carbon atoms or phenyl, at least one of R$_2$, R$_3$ and
  R$_4$ being alkyl having 1-4 carbon atoms or phenyl, and
R$_5$ is alkyl having 1-4 carbon atoms,
exhibit strong fungicidal properties.

In our copending U.S. application, Ser. No. 757,090, filed simultaneously herewith and now abandoned, sulfonic acid salts of substituted guanidines are disclosed and claimed which also possess superior fungicidal properties.

The present invention further provides a process for the production of salts of formula (I) above in which an alkylsulfuric acid S-alkyl-isothiuronium salt having the formula:

$$R_5-S-C\begin{matrix}NR_2\\ \diagdown\\ N\\ \diagdown\\ R_4\end{matrix}\begin{matrix}\diagup\\ \diagup R_3\\ \\ \cdot HOSO_2OR_5\end{matrix} \quad (IIa)$$

in which
R$_2$ to R$_5$ are the same as defined above is reacted with an amine having the formula:
$$R_1 - NH_2 \quad (IIb)$$
in which
R$_1$ is the same as defined above.

Preferably, the alkylsulfuric acid S-alkyl-isothiuronium salts used as starting materials are prepared immediately before the above reaction according to the invention by reacting the corresponding thioureas with a dialkyl-sulfate (normally in the molar ratio 1:1) at 10° to 90°C. The amine of formula (IIb) above is then added dropwise to the reaction mixture, and the main reaction commences.

It is decidedly surprising that the new guanidine salts according to the present invention exhibit stronger fungicidal properties than the known salts of dodecyl-guanidine.

The production reaction can be represented by the following equation:

$$CH_3SC\begin{matrix}NCH_3\\ \diagup\!\!\!\!\diagdown\\ \\ \diagdown\\ NH_2\end{matrix} \cdot HOSO_2OCH_3 + C_{12}H_{25}NH_2 \rightarrow$$

(IIaa)          (IIbb)

$$C_{12}H_{25}NHC\begin{matrix}NCH_3\\ \diagup\!\!\!\!\diagdown\\ \\ \diagdown\\ NH_2\end{matrix} \cdot HOSO_2OCH_3 + CH_3SH$$

(I$_1$)

Advantageously, in accordance with the present invention, in the various formulae set forth herein:
R$_1$ represents n-dodecyl or n-tetradecyl;
R$_2$, R$_3$ and R$_4$ each individually represents hydrogen;
  alkyl having 1-4 carbon atoms, such as methyl, ethyl, n- and iso-propyl, n-, iso-, sec.- and tert.-butyl, and the like, especially methyl, ethyl, isopropyl, n-butyl and isobutyl; or
phenyl; and
R$_5$ represents alkyl having 1-4 carbon atoms as defined above;
with the proviso that at least one of R$_2$, R$_3$ and R$_4$ is alkyl having 1-4 carbon atoms or phenyl.

Preferably, R$_2$ is hydrogen or methyl, R$_3$ is hydrogen, methyl, butyl, especially n-butyl, or phenyl, R$_4$ is hydrogen or methyl, and R$_5$ is methyl or butyl, especially n-butyl, When carrying out the preferred process, dimethyl-sulfate, diethyl-sulfate, diisopropyl-sulfate or di-n-butyl-sulfate may be used as the dialkyl-sulfate.

The reaction is preferably carried out in the presence of an inert solvent (this term includes a mere diluent). When a single phase system is used, the solvent may suitably be water or mixtures of water and lower alcohols, such as methanol and ethanol, as well as ethers, such as dioxan. However, the reaction may also take place in a heterogeneous system. In this case, besides water, water-insoluble diluents such as hydrocarbons, for example toluene, and chlorinated hydrocarbons, for example chlorobenzene, may be used.

The reaction temperatures can be varied within a fairly wide range. In general, the work is carried out at substantially between about 10°-100°C, preferably between about 30°-80°C.

When carrying out the process, approximately 1 mol of dodecyl or tetradecyl amine is generally used for each mol of the isothiuronium salt. Working up takes place in manner known per se, for example by distilling off the diluent in a vacuum.

The new active compounds according to the invention exhibit a strong fungicidal activity. Because of their low toxicity to warm-blooded animals such new compounds are suitable for the control of undesired fungus plant growth and their good compatibility with higher plants permits their use as plant protection agents against fungal plant diseases.

The instant compounds are particularly well suited for the control of parasitic fungi on above-the-soil parts of plants. These include Phytophthora species, Peronospora species, Alternaria species, *Botrytis cinerea* and Septoria species. The new active compounds are particularly effective against the causative organisms of scab diseases, such as apple scab and pear scab, that is, against the Venturia species.

The active compounds according to the instant invention can be utilized, if desired, in the form of the usual formulations or compositions with diluents or extenders, i.e. dispersible carrier vehicles, such as solutions, emulsions, suspensions, emulsifiable concentrates, spray powders, pastes, soluble powders, dusting agents, granules, etc. These are prepared in known manner, for instance by extending the active compounds with dispersible liquid diluent carriers and/or dispersible solid carriers optionally with the use of carrier vehicle assistants, e.g. surface-active agents, including emulsifying agents and/or dispersing agents, whereby, for example, in the case where water is used as diluent, organic solvents may be added as auxiliary solvents. The following may be chiefly considered for use as carrier vehicles for this purpose: dispersible liquid diluent carriers including inert organic solvents, such as aromatic hydrocarbons (e.g. benzene, toluene, xylene, etc.), halogenated, especially chlorinated, aromatic hydrocarbons (e.g. chlorobenzenes, etc.), paraffins (e.g. petroleum fractions), chlorinated aliphatic hydrocarbons (e.g. methylene chloride, etc.), alcohols (e.g. methanol, ethanol, propanol, butanol, etc.), amines (e.g. ethanolamine, etc.), ethers, ether-alcohols (e.g. glycol monomethyl ether, etc.), amides (e.g. dimethyl formamide, etc.), sulfoxides (e.g. dimethyl sulfoxide, etc.), ketones (e.g. acetone, etc.), and/or water; as well as dispersible finely divided solid carriers, such as ground natural minerals (e.g. kaolins, alumina, silica, chalk, i.e. calcium carbonate, talc, kieselguhr, etc.) and ground synthetic minerals (e.g. highly dispersed silicic acid, silicates, e.g. alkali silicates, etc.); whereas the following may be chiefly considered for use as carrier vehicle assistants, e.g. surface-active agents, for this purpose: emulsifying agents, such as non-ionic and/or anionic emulsifying agents (e.g. polyethylene oxide esters of fatty acids, polyethylene oxide ethers of fatty alcohols, alkyl sulfonates, aryl sulfonates, etc., and especially alkyl arylpolyglycol ethers, magnesium stearate, sodium oleate, etc.); and/or dispersing agents, such as lignin, sulfite waste liquors, methyl cellulose, etc.

Such active compounds may be employed alone or in the form of mixtures with one another and/or with such solid and/or liquid dispersible carrier vehicles and/or with other known compatible active agents, especially plant protection agents, such as other fungicides, herbicides, insecticides, bactericides, etc., if desired, or in the form of particular dosage preparations for specific application made therefrom, such as solutions, emulsions, suspensions, powders, pastes, and granules which are thus ready for use.

As concerns commercially marketed preparations, these generally contemplate carrier composition mixtures in which the active compound is present in an amount substantially between about 0.1–95%, and preferably 0.5–90%, by weight of the mixture, whereas carrier composition mixtures suitable for direct application or field application generally contemplate those in which the active compound is present in an amount substantially between about 0.001–1%, preferably 0.003–0.5%, by weight of the mixture. Thus, the present invention contemplates over-all compositions which comprise mixtures of a dispersible carrier vehicle such as (1) a dispersible carrier solid, and/or (2) a dispersible carrier liquid such as an inert organic solvent and/or water preferably including a carrier vehicle assistant, e.g. surface-active agent, such as an emulsifying agent and/or a dispersing agent, and an amount of the active compound which is effective for the purpose in question and which is generally about 0.001–95%, and preferably 0.003–95%, by weight of the mixture.

The active compound can also be used in accordance with the well known ultra-low-volume process with good success, i.e. by applying such compound if normally a liquid, or by applying a liquid composition containing the same, via very effective atomizing equipment in extremely finely divided form, i.e. mist form, for example by airplane crop spraying techinques. Only a few liters/hectare are needed, and often amounts up to about 1 quart/acre, preferably 2–16 fluid ounces/acre, are sufficient. In this process it is possible to use a highly concentrated liquid composition with said liquid carrier vehicles containing from about 40 to about 95% by weight of active compound, or even the 100% active substance alone, e.g. about 40–100% by weight of the active compound.

In particular, the present invention contemplates methods of selectively controlling or combating fungi, which comprises applying to at least one of (a) such fungi and (b) their habitat, i.e. the locus to be protected, a fungicidally effective amount of the particular active compound of the invention alone or together with a carrier vehicle as noted above. The instant formulations or compositions are applied in the usual manner, for instance by spraying, atomizing, vaporizing, scattering, dusting, watering, sprinkling, pouring, and the like.

It will be realized, of course, that the concentration of the particular active compound utilized in admixture with the carrier vehicle will depend upon the intended application. Therefore, in special cases, it is possible to go above or below the aforementioned concentration ranges.

The activity of the new compounds according to the invention is illustrated, without limitation, by the following Examples.

EXAMPLE 1

Fusicladium test (apple scab) [Protective]
Solvent: 4.7 parts by weight acetone
Emulsifier: 0.3 parts by weight alkylaryl polyglycol ether
Water: 95 parts by weight The amount of active compound required for the desired concentration of the active compound in the spray liquid is mixed with the stated amount of solvent, and the resulting concentrate is diluted with the stated amount of water which contains the stated solvent and emulsifier.

Young apple seedlings in the 4–6 leaf stage are sprayed with the spray liquid until dripping wet. The plants remain in a greenhouse for 24 hours at 20°C and at a relative atmospheric humidity of 70%. They are then inoculated with an aqueous conidium suspension of the apple scap causative organism (*Fusicladium dendriticum* Fuckel) and incubated for 18 hours in a humidity chamber at 18°–20°C and at a relative atmospheric humidity of 100%.

The plants then again are placed in a greenhouse for 14 days.

15 days after inoculation, the infestation of the seedlings is determined as a percentage of the untreated but also inoculated control plants.

0% means no infestation; 100% means that the infestation is exactly as great as in the case of the control plants.

The active compounds, their concentrations and the results obtained can be seen from the following Table 1.

TABLE 1

Fusicladium test [Protective]

EXAMPLE 2

A further test was carried out in the same manner as Example 1 and the results are shown below in Table 2.

TABLE 2

Fusicladium test [protective]

| Active compound | | Infestation as a percentage of the infestation of the untreated control with a concentration of active compound (in %) of 0.0031 |
|---|---|---|
| (7₁) n—C₁₄H₂₉NHC(=NH)NHCH₃ | · HOSO₂OCH₃ | 18 |
| (8₁) n—C₁₄H₂₉NHC(=NCH₃)N(CH₃)₂ | · HOSO₂OCH₃ | 12 |
| (9₁) n—C₁₄H₂₉NHC(=NCH₃)N(CH₃)₂ | · HOSO₂OC₄H₉—n | 20 |

| Active compound | Infestation as a percentage of the infestation of the untreated control with a concentration of active compound (in %) of 0.0031 |
|---|---|
| (10₁) n—C₁₄H₂₉NHC(=NH)(NH)—C₆H₅ · HOSO₂OCH₃ | 12 |
| (11₁) n—C₁₄H₂₉NHC(=NH)(NH)—C₆H₅ · HOSO₂OC₄H₉—n | 18 |

The process for producing the new compounds of the invention is illustrated, without limitation, by the following further Examples.

EXAMPLE 3

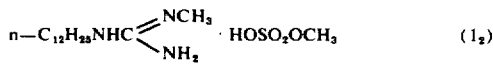

(1₂)   n—C₁₂H₂₅NHC(NCH₃)(NH₂) · HOSO₂OCH₃

To a suspension of 9g N-methyl-thiourea in 50 ml of water 12.6g dimethyl-sulfate are added dropwise. The temperature rises to 55°C. Stirring is continued for half an hour at 70°C. The methyl-sulfuric acid S-methyl-N-methyl-isothiuronium salt is thereby formed. A solution of 18.5g n-dodecylamine in 50 ml methanol is allowed to flow into the reaction solution and methylmercaptan is evolved continuously. After cessation of the evolution of gas, the reaction solution is concentrated in a vacuum and 34.5g of the salt of the above formula are obtained in the form of a viscous oil of $n_D^{20} = 1.4670$, i.e. N-dodecyl-N''-methyl-guanidine-methyl-sulfuric acid salt.

In analogous manner there are obtained:

(12₁)   n—C₁₂H₂₅NHC(NCH₃)(NHCH₃) · HOSO₂OCH₃   waxy (3₂)    n—C₁₂H₂₅NHC(NCH₃)(N(CH₃)₂) · HOSO₂OCH₃   waxy (13₁)   n—C₁₂H₂₅NHC(NCH₃)(NHC₄H₉) · HOSO₂OCH₃   waxy (14₁)   n—C₁₂H₂₅NHC(NH)(N(CH₃)₂) · HOSO₂OCH₃   waxy (15₁)   n—C₁₂H₂₅NHC(NH)(NH—C₆H₅) · HOSO₂OCH₃   waxy

EXAMPLE 4

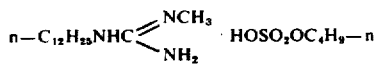

(16₁)   n—C₁₂H₂₅NHC(NCH₃)(NH₂) · HOSO₂OC₄H₉—n

To a suspension of 9g N-methyl-thiourea in 50 ml of water there are added dropwise, at room temperature, 21g di-n-butyl-sulfate and the temperature is allowed to rise. Stirring is continued for 1 hour at 70°C. To the reaction solution, which contains the n-butyl-sulfuric acid S-n-butyl-N-methyl-isothiuronium salt, is added dropwise a solution of 18.5g n-dodecylamine in 50 ml butanol. Heating at 70°C is carried out for about 3 hours and the reaction solution is concentrated in a vacuum. 41g of the salt stated above remain behind in the form of a viscous oil of $n_D^{20} = 1.4687$, i.e. N-dodecyl-N''-methyl-guanidine-n-butyl-sulfuric acid salt.

In analogous manner there are obtained:

(4₂)    n—C₁₂H₂₅NHC(NCH₃)(NHCH₃) · HOSO₂OC₄H₉—n   waxy (5₂)    n—C₁₂H₂₅NHC(NCH₃)(N(CH₃)₂) · HOSO₂OC₄H₉—n   waxy (17₁)   n—C₁₂H₂₅NHC(NCH₃)(NHC₄H₉) · HOSO₂OC₄H₉—n   $n_D^{20} = 1.4662$ In an analogous manner, using n-tetradecylamine in corresponding molar amounts in place of n-dodecylamine, the appropriate n-tetradecyl guanidine alkyl sulfuric acid salts (cf. Table 2) are produced.

It will be realized by the artisan that all of the foregoing compounds contemplated by the present invention possess the desired strong fungicidal properties, with regard to a broad spectrum of activity, as well as a comparatively low toxicity toward warm-blooded creatures and a concomitantly low phytotoxicity, enabling such compounds to be used with correspondingly favorable compatibility with warm-blooded creatures and plants for more effective control and/or elimination of fungi by application of such compounds to such fungi and/or their habitat.

It will be appreciated that the instant specification and examples are set forth by way of illustration and not limitation, and that various modifications and changes may be made without departing from the spirit and scope of the present invention which is to be limited only by the scope of the appended claims.

What is claimed is:

1. Alkylsulfuric acid salt of substituted guanidine having the formula

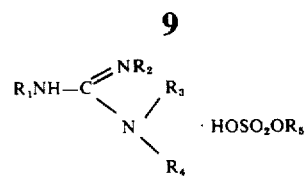

in which $R_1$ is selected from the group consisting of n-dodecyl and n-tetradecyl, $R_2$, $R_3$ and $R_4$ each individually is selected from the group consisting of hydrogen, alkyl having 1–4 carbon atoms and phenyl, and $R_5$ is alkyl having 1–4 carbon atoms, with the proviso that at least one of $R_2$, $R_3$ and $R_4$ is selected from the group consisting of such alkyl and phenyl.

2. Salt according to claim 1 wherein $R_1$ is n-dodecyl, $R_2$ is selected from the group consisting of hydrogen and methyl, $R_3$ is selected from the group consisting of hydrogen, methyl, n-butyl and phenyl, $R_4$ is selected from the group consisting of hydrogen and methyl, and $R_5$ is selected from the group consisting of methyl and n-butyl, with the proviso that at least one of $R_2$, $R_3$ and $R_4$ is a corresponding stated radical other than hydrogen.

3. Salt according to claim 1 wherein $R_1$ is n-tetradecyl, $R_2$ is selected from the group consisting of hydrogen and methyl, $R_3$ is selected from the group consisting of hydrogen, methyl, n-butyl and phenyl, $R_4$ is selected from the group consisting of hydrogen and methyl, and $R_5$ is selected from the group consisting of methyl and n-butyl, with the proviso that at least one of $R_2$, $R_3$ and $R_4$ is a corresponding stated radical other than hydrogen.

4. Salt according to claim 1 wherein such compound is N-n-dodecyl-N''-methyl-guanidine-methyl sulfuric acid salt having the formula

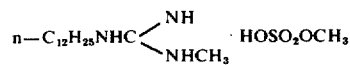

5. Salt according to claim 1 wherein such compound is N-n-dodecyl-N',N'-dimethyl-N''-methyl-guanidine-methyl sulfuric acid salt having the formula

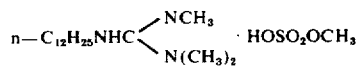

6. Salt according to claim 1 wherein such compound is N-n-dodecyl-N',N'-dimethyl-N''-methyl-guanidine-n-butyl-sulfuric acid salt having the formula

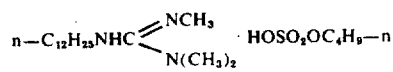

7. Salt according to claim 1 wherein such compound is N-n--dodecyl-N'-phenyl-guanidine-n-butyl-sulfuric acid salt having the formula

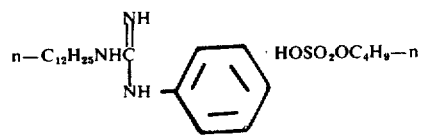

8. Salt according to claim 1 wherein such compound is N-n-tetradecyl-N'-methyl-guanidine-methyl-sulfuric acid salt having the formula

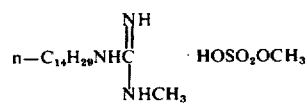

9. Salt according to claim 1 wherein such compound is N-n-tetradecyl-N',N'-dimethyl-N''-methyl-guanidine-methyl-sulfuric acid salt having the formula

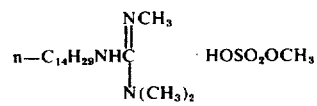

10. Salt according to claim 1 wherein such compound is N-n-tetradecyl-N'-phenyl-guanidine-methyl-sulfuric acid salt having the formula

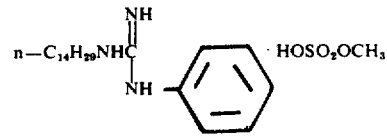

* * * * *